United States Patent

[11] 3,622,007

| [72] | Inventor | James S. Pappathatos<br>Burnsville, Minn. |
| --- | --- | --- |
| [21] | Appl. No. | 844,590 |
| [22] | Filed | July 24, 1969 |
| [45] | Patented | Nov. 23, 1971 |
| [73] | Assignee | General Metal Products Corp. |

[54] FUEL FILTER
2 Claims, 11 Drawing Figs.

[52] U.S. Cl. ............................................. 210/445
[51] Int. Cl. ............................................ B01d 35/20
[50] Field of Search ................................. 210/445,
446, 287, 178, 179, 384, 388; 55/288, 300

[56] References Cited
UNITED STATES PATENTS

| 649,082 | 5/1900 | Stahle | 210/287 |
| --- | --- | --- | --- |
| 1,020,782 | 3/1912 | Tinker | 210/445 UX |
| 2,202,403 | 5/1940 | Sandberg | 210/445 |
| 3,002,870 | 10/1961 | Belgarde et al. | 210/446 X |

*Primary Examiner*—Rueben Friedman
*Assistant Examiner*—T. A. Granger
*Attorney*—Alfred E. Hall ABSTRACT: A fuel filter having two easily gripped sediment bowls with a filter element and seal disposed therebetween and wherein each sediment bowl is constructed internally such that a sediment chamber is provided in either the horizontal or vertical position thus providing a filter element which is mountable in any position yet which will still provide proper filtering action. Further, with the use of an adapter, either bowl may be directly attached to a carburetor, thus allowing the novel filter to be used as either an incline filter or a carburetor attached filter.

PATENTED NOV 23 1971 3,622,007

INVENTOR
JAMES S. PAPPATHATOS

BY *Alfred E. Hall*

ATTORNEY

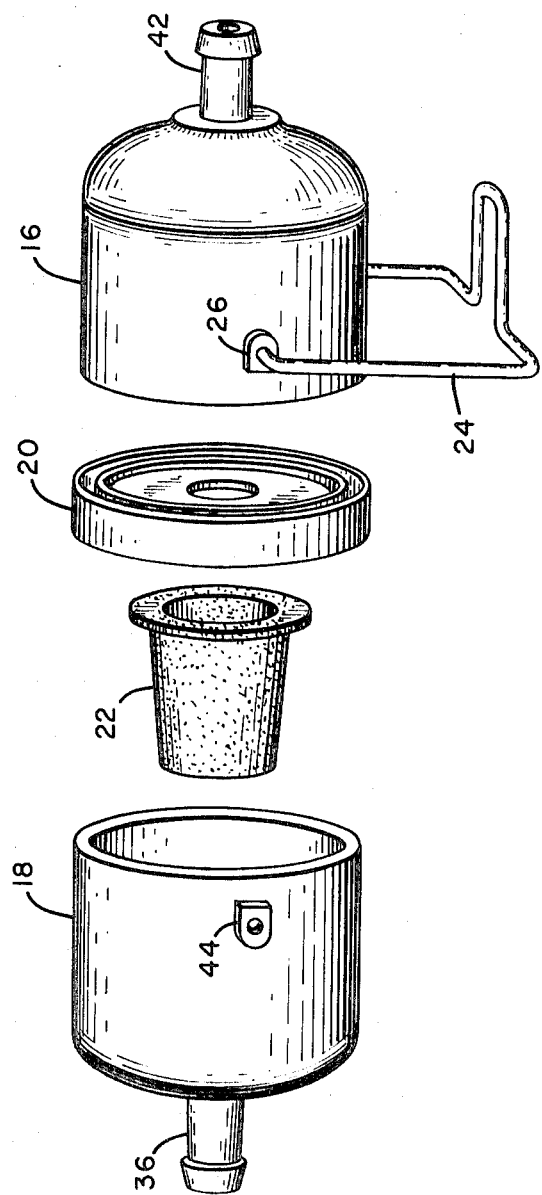

INVENTOR
JAMES S. PAPPATHATOS

BY *Alfred E. Hall*

ATTORNEY

FUEL FILTER

BACKGROUND OF THE INVENTION

The present invention relates to a fuel filter which is so constructed that it can be mounted in any position as an in-line or carburetor attached filter and yet provide the proper filtering action.

In snowmobiles and other related equipment which are designed to operate for extended periods of time in cold weather, a problem has arisen with respect to the fuel-filtering system. The problem occurs when water or other foreign particles contaminate the fuel line or system. Either the water, if it freezes, or the foreign elements in combination with the freezing water, caused the filter elements to be clogged sufficiently to prevent the adequate flow of fuel to the carburetor. Prior art filters are made of sintered bronze or like materials and are attached either directly to the carburetor or are used as in-line units which are remotely located from the carburetor in an effort to make the unit conveniently accessible to the operator of the vehicle. Presently existing units, however, are difficult to disassemble and upon being sufficiently clogged, to prevent an adequate flow of fuel to the carburetor, require the operator to remove his gloves and utilize some type of tool to remove and clean the filter.

Further, present filter units, regardless of the type of equipment on which used, either have no provision for allowing contaminants to settle out or, if such provisions are so made, the filter unit must be mounted in a specific position in order that proper settling can occur. Since, if proper filtering action is to occur, the filter must be located or mounted in a specific position, it is obvious that the location of the filter must be chosen with care and sometimes must be placed in locations which are not conveniently accessible by the operator of the vehicle.

Thus the prior art fuel filters are not only difficult to disassemble and may require an operator of a vehicle to remove his gloves in cold weather and require the use of some disassembling tools, but also, if proper fuel settlement settling is provided, must be mounted in a specific position in order to provide proper settling.

SUMMARY

The present invention is a fuel filter which overcomes the disadvantages of the prior art in that it can be easily disassembled by an operator wearing gloves without the use of any tools and, further, can be mounted either directly on the carburetor or used as an in-line unit. The unit is so constructed that it requires no special mounting position and in fact can be mounted in any position and still provide proper filtering and sediment settling action. The in-line unit consists of two sediment bowls with a filter element and seal disposed there between and wherein each sediment bowl is constructed internally such that a sediment chamber is provided in either the horizontal or vertical positions or any combination thereof thus providing a filter element which is mountable in any position yet which will still provide proper filtering action. Further, with the use of an adapter, either of the sediment bowls may be directly attached to a carburetor, thus allowing the novel filter to be used either as an in-line filter or a carburetor attached filter.

Also, the filter element is mounted in a seal that is so constructed that vibration of the unit causes the filter element to vibrate thus creating a washing action of the filter element whereby the element tends to keep itself clean by continually moving in the fuel which it is cleaning.

Thus, it is an object of the present invention to provide a fuel filter which is simple and economically constructed and which may be disassembled by an operator wearing gloves without the use of special tools.

It is another object of the present invention to provide a novel fuel filter in which the sediment bowls are so constructed that an individual bowl may be directly attached to a carburetor or two of the bowls may be attached to each other with a filter element and seal disposed there between thus forming an in-line unit.

It is still another object of the present invention to provide a novel fuel filter with a sediment bowl so constructed internally that it may be mounted in either the vertical or horizontal positions or any combination thereof and still provide proper settling action for any sediment which may be trapped in the fuel lines.

It is yet another object of the present invention to provide a novel fuel filter which includes a seal that holds the filter element in such a manner that a washing or self-cleaning action of the element occurs.

BRIEF DESCRIPTION OF THE DRAWINGS

Additional objects and advantages of the invention will be apparent from the following description and drawings in which:

FIG. 3 is an exploded isometric view of the in-line filter showing each of the two bowls, the filter, and the retaining seal;

DESCRIPTION OF THE PREFERRED EMBODIMENTS

Figure 1:
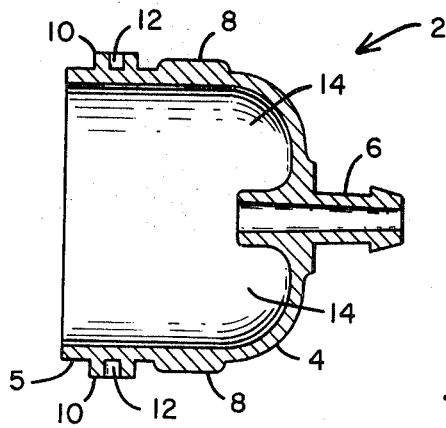
FIG. 1 is a sectional view of one of the novel sediment bowls showing the internal construction thereof whereby proper sediment settling action may occur regardless of the mounting position of the bowl.
Figure 7:
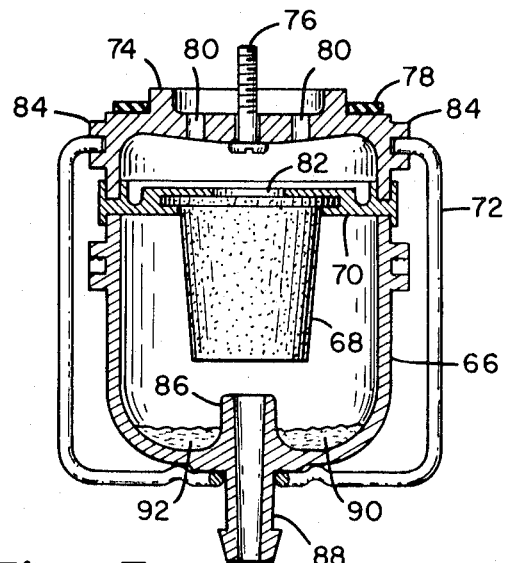
FIG. 7 is a sectional view of the novel filter wherein an adapter is used to attach the filter directly to the carburetor unit.

FIG. 1 is a sectional view of one of the novel sediment bowls which is used to form the fuel filter of the present invention. The cup-shaped bowl is designated generally by the numeral 2 and comprises tubular outside walls 5 and bottom wall 4 including integrally formed port 6 which may be used as either an input or output port. Raised portions 8 form gripping surfaces which can be placed uniformly around the circumference of the bowl if desired in order to form a convenient hand grip device but are not absolutely necessary. Flanges 10 having therein sockets 12 provide means whereby a spring device may be attached which conveniently holds bowl 2 in operative relationship with the remaining portions of the fuel filter which are not shown in FIG. 1. It will be noted that internal cavities 14 which are formed by the internal expension of port 6 and the internal wall of bowl 2 are so shaped that bowl 2 can be mounted in any position about the vertical or horizontal axis and still provide proper sedimentary action requiring only that another bowl identical to bowl 2 be attached thereto as shown in FIG. 2 or that a seal close the open end of the cup-shaped bowl as shown in FIG. 7.

Figure 2:
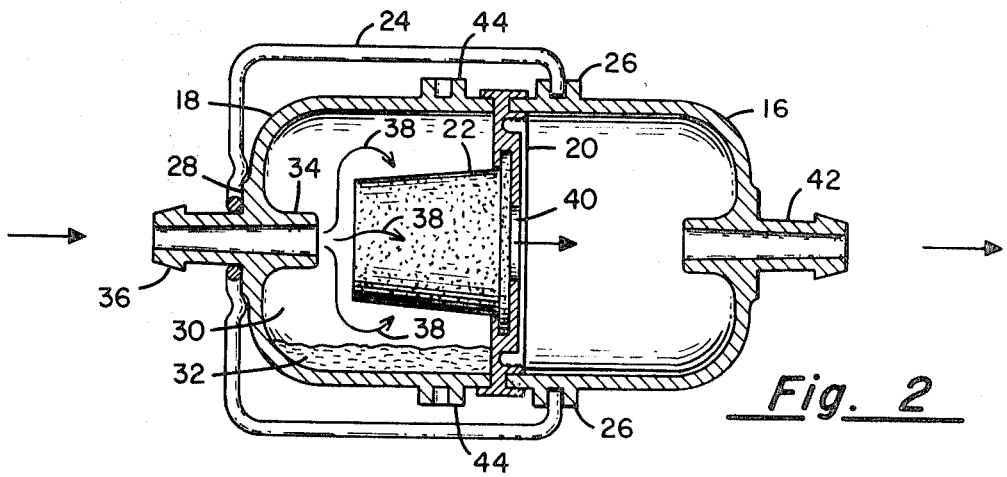
FIG. 2 is a sectional view of two of the sediment bowls coupled together with a filter element and seal disposed there between to form an in-line unit.

FIG. 2 discloses the novel filter which is so constructed as to form an in-line filter unit. It will be noted that two identical bowls 16 and 18 which are constructed identically to the bowl shown in FIG. 1, are attached to each other by means of retaining seal 20. A sintered bronze filter element 22 is detachably fastened to retaining seal 20. It will be seen that the entire assembly is maintained in the position shown by spring 24 which is pivotally attached to bowl 16 by means of mounting flanges 26 and which, when pivoted, has the outer end resting on shoulder 28 of bowl 18 thus forcing bowl 18 against retaining seal 20 to lock the elements in a unitary fuel filter device. It will be noted that the device is symmetrical about its longitudinal axis and, thus, even though the device is rotated 360° about its longitudinal axis, it will still provide lower chamber 30 wherein sediment 32 may accumulate. It will also be noted that if the device were utilized in a vertical position, the internal extension 34 of input port 36 would form a chamber with the internal walls of bowl 18 which would serve as a sediment trap. Since bowl 16 is identically constructed with bowl 18, it is obvious that the device is symmetrical about a vertical axis and thus could be used in any position and still provide the proper sediment traps. It can be seen in FIG. 2 that the fuel enters the inlet port 36 and passes through the sintered bronze filtering element 22 as shown by arrows 38. Sintered bronze filtering element 22 removes any contaminants which are greater than 40 microns in diameter and the cleaned fuel passes through orifice 40 in retaining seal 20 into the open chamber of bowl 16. It is obvious that the filter element may have a range of micron sizes for various purposes and applications and is not, therefore, to be limited to 40 microns. The filtered fuel passes through exit nozzle 42 on its way to the vehicle carburetor. It will also be noted that bowl 18 has thereon mounting brackets 44 to which a spring such as spring 24 may be attached to fasten the elements together to make a unitary fuel filter.

FIG. 3 is an exploded isometric view of the in-line filter shown in FIG. 2. As shown in FIG. 3, bowl 18 includes inlet port 36 and spring mounting bracket 44. Bowl 16 includes outlet port 42, spring mounting brackets 26, and spring 24. Interspaced between bowl 16 and 18 is sintered bronze filter element 22 which is attached to retaining seal 20.

Figure 4A:
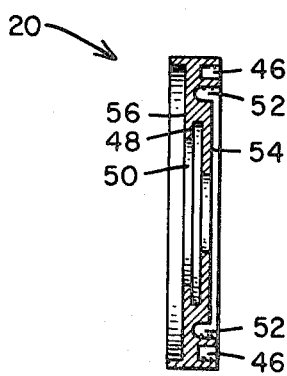
FIGS. 4a and 4b are a sectional and top view respectively of the retaining seal.
Figure 4B:
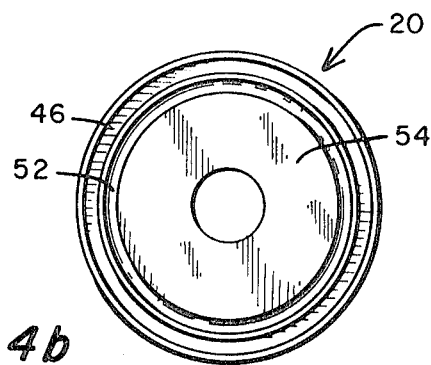

FIG. 4a and 4b are sectional and top views respectively of retaining seal 20 shown in FIG. 2. This seal is made of a resilient, gasoline resistent material such as Buna-n, 70 durometer type. Retaining seal 20 is formed with slots 46 which receive the edges of the outer end of the tubular side walls of the cup-shaped bowl and which grip the edges of the bowl and attach themselves thereto by friction action. Further, the mounting ring of the sintered bronze filter unit is detachably received by slots 48 with the main body of the sintered bronze filtering unit protruding through orifice 50. Thus, the slot 48 firmly holds the sintered bronze filtering element in place with respect to the retaining seal and yet allows it to be removed when necessary. It will be noted that slots 52 cause the center portion 54 of the retaining seal 20 which holds the sintered bronze filtering element to be separated from the remainder of the retaining seal by thin wall 56. The purpose for this construction is to cause a washing action of the sintered bronze filtering element. Since the retaining seal is made of a resilient flexible material, any vibration of the machine to which the filter is attached will cause center portion 54 to vibrate because of thin flexible wall 56. This vibration will cause the sintered bronze filtering element which is attached to center unit 54, to vibrate and thus will be washed by the fuel passing through the element and which is accumulating in the bowl in which the element is placed. Thus the retaining seal 20 is constructed in such a manner as to provide not only a seal between the settling bowls, but also to retain the sintered bronze filtering element and to retain it in such a manner as to cause it to be continually washed or cleansed by the fuel passing through the filter.

Figure 5A:
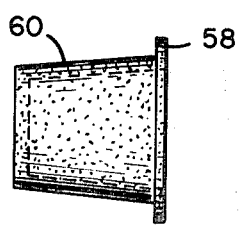
FIGS. 5a and 5b are side and end views respectively of the sintered bronze filtering element.
Figure 5B:
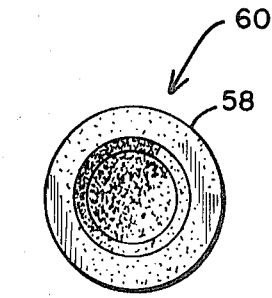

FIGS. 5a and 5b are side and end views respectively of the sintered bronze filtering element. The material itself is old and well known in the art and has been used on prior occasions as fuel filtering elements. In this particular case, the bronze may be constructed in such a manner to form a 40 micron porosity. Mounting flange 58 is received by slot 48 shown in FIG. 4a and it is in this manner that the retaining seal 20 holds the sintered bronze filtering element 60.

Figure 6A:
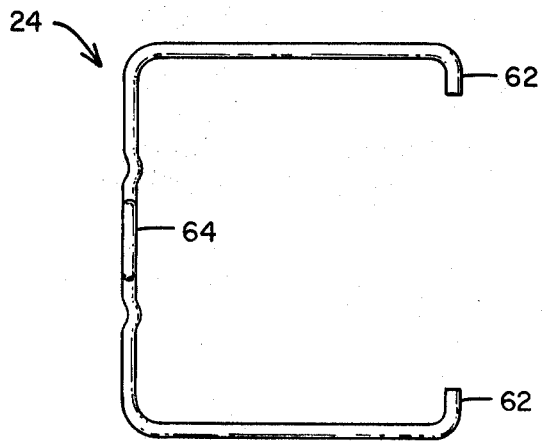
FIGS. 6a, 6b and 6c are three elevational views of the locking spring.
Figure 6B:
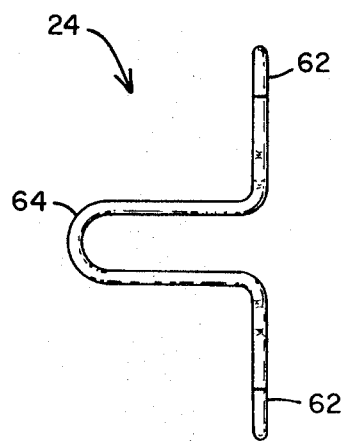
Figure 6C:
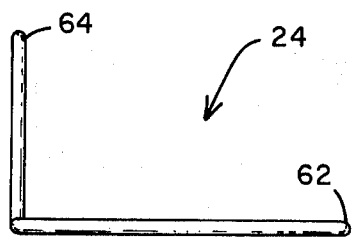

FIGS. 6a, 6b and 6c show three elevational views of the locking spring 24 shown in FIG. 2. The spring is made of stainless steel and is constructed in a well-known manner to provide fingers 62 which attach to the spring mounts on the sediment bowls as shown in FIG. 2. The spring is bent at one end to form extension 64 shown in FIG. 6b which is used as a convenient handhold when fastening or unfastening the two sediment bowls.

FIG. 7 discloses the novel filter element when used with an adapter which allows it to be attached directly to the carburetor. Bowl 66, sintered bronze filtering element 68, retaining seal 70 and spring 72 are constructed in the same manner as previously described. However, adapter 74 is connected directly to the carburetor by means of screw 76. Seal or gasket 78 fits between the adapter and the carburetor and thus prevents any fuel from escaping there between. Adapter 74 includes orifices 80 which allow the fuel passing through sintered bronze filtering element 68 and the orifice 82 of retaining seal 70 to reach the carburetor. It will also be noted that the adapter 74 has spring mounting brackets 84 to which spring unit 72 may be attached thus holding the bowl 66 and retaining seal 70 in close contact with adapter 74. It will be noted that when used in this position, the internal extension 86 of inlet port 88 forms chamber 90 which receives any sediment 92 which may be in the fuel.

The filter shown in either FIG. 2 or FIG. 7 is easily disassembled and cleaned, even by an operator wearing gloves. Further, since the in-line filter can be mounted in any position, it can be located in an easily accessible area within convenient reach of the operator, thus overcoming the disadvantages of prior art filters. Suppose, with the filter shown in FIG. 2, that ice has coated the sintered bronze element 22, and that sedimentary materials are in the bowl in sufficient quantity to begin to restrict fuel flow to the carburetor. The operator, even with gloves on his hands, merely pivots spring 24 away from the shoulder 28 of bowl 18, thus allowing bowl 18 to be separated from retaining seal 20. The flexible hose attached to inlet port 36 will allow bowl 18 to be tapped gently in an upside-down position to cause any sediment in the bowl to be ejected. Further, by using bowl 18 to gently tap the sintered bronze filtering element 22 will cause ice and sedimentary particles to be dislodged therefrom. In particular, this is true since the element 22 is mounted in resilient retaining seal 20 which is flexible and therefore striking the bronze element 22 with bowl 18 causes little if any damage. To reassemble the units the operator merely places bowl 18 snugly against retaining seal 20 and snaps spring 24 over the shoulder 28 of bowl 18. Thus the filter unit has been cleaned and is ready for use again. The filter shown in FIG. 7 can be cleaned in a similar manner. It is also obvious that the filters disclosed in FIGS. 2 and 7 could be used as sediment settling bowls only by removal of the bronze filtering element.

Thus there has been disclosed a novel fuel filter element which is economical to construct, which can easily be disassembled and cleaned even by the operator wearing gloves, which can provide proper sediment settling action in either the vertical or horizontal positions or in any combination thereof when used as an in-line filter, and which provides self-cleaning action of the bronze filtering element by mounting the filtering element in a retaining seal made of resilient, flexible material which tends to vibrate, thus causing a washing action of the filter element.

Although this invention has been described with particular reference to a particular environment, various features, construction details and materials, and functional relationships, various changes will be apparent to one skilled in the art, and the invention is not to be limited to any particular environment, features, construction, materials, functional relationships, or particular engines except as set forth in the appended claims.

I claim:

1. A fuel filter comprising:

a. A fuel filter element having an annular mounting flange at its greatest diameter, b. a cup-shaped member having a tubular wall terminating in an annular end edge and a bottom with a port in the bottom extending outwardly for receiving a hose connection and inwardly to form a sediment chamber whether the cup-shaped member is in a vertical or horizontal position, and c. a retaining seal having three annular grooves therein, 1. one of said annular grooves opening radially inwardly and receiving the mounting flange of the filter element,
2. another of said annular grooves opening axially of the seal and receiving the annular end edge of the tubular wall to provide a liquidtight seal with the cup-shaped member,
3. the remaining annular groove opening axially of the seal between the first two annular grooves and defining in the seal an annular flexible wall whereby vibrations received by said cup-shaped member are transmitted to said filter element causing it to vibrate and wash itself in fuel in said cup-shaped member.

2. A fuel filter comprising:
a. a fuel filter element having an annular mounting flange at its greatest diameter,
b. a pair of identical cup-shaped members each having a tubular wall terminating in an annular end edge and a bottom formed with a port, said cup-shaped members cooperating to form a sediment bowl for fuel passing from one port to the other regardless of the position in which said mounting device is mounted,
c. a retaining seal having three annular grooves therein,
  1. one of said annular grooves opening radially and receiving the mounting flange of the filter element,
  2. another of said annular grooves opening axially of the seal and receiving the end edge of the tubular wall of one cup-shaped member thereby providing a seal between said cup-shaped members,
  3. the remaining annular groove opening axially of the seal between the first two annular grooves and defining in the seal a flexible wall whereby vibrations received by said cup-shaped members are transmitted to said filter element causing it to vibrate and wash itself in fuel in said cup-shaped members, and
d. means to maintain said cup-shaped members in assembled relation.

* * * * *